M. W. MIX.
REINFORCED VENEER.
APPLICATION FILED AUG. 29, 1916.

1,215,570.

Patented Feb. 13, 1917.

Melville W. Mix  Inventor

N. S. Amstutz

By

Attorney

UNITED STATES PATENT OFFICE.

MELVILLE W. MIX, OF MISHAWAKA, INDIANA.

REINFORCED VENEER.

1,215,570.   Specification of Letters Patent.   Patented Feb. 13, 1917.

Application filed August 29, 1916. Serial No. 117,500.

*To all whom it may concern:*

Be it known that I, MELVILLE W. MIX, a citizen of the United States, residing at Mishawaka, in the county of St. Joseph and State of Indiana, have invented certain new and useful Improvements in Reinforced Veneers, of which the following is a specification.

My invention relates to reinforced veneers and it specially appertains to the features pointed out in the annexed claims.

The purpose of my invention is to produce a veneer reinforcement specially suitable for aero or other services in which the greatest possible strength is required with minimum weight. To produce a veneer reinforcement that will securely adhere to the plies to which it is secured; to produce an article of manufacture for general purposes that will be elastic within limits without sacrificing the strength of various structures that may be formed of it; that contrary to the usual practice of placing reinforcements across the grain of the laminæ to which they are applied places them on the ply parallel to its grain; that avoids the double-thickness difficulty when woven wire or similar reinforcements are used; that avoids the breaking down of the structural fiber of the plies when reinforcements are placed at an angle to the grain and pressed into the veneer; that uses reinforcing elements such as metallic ribbons, bands, bars, rods or wires as independent units placed parallel to each other and the grain of the ply of which they are to form a part.

With these and other ends in view I illustrate in the accompanying drawing such instances of adaptation as will disclose the broad fundamental features without limiting myself to the specific details shown.

Figure 1 instances a cross section in which the reinforcing bands are embedded in the same sides of two superposed plies both being secured to a supporting or backing ply.

Figure 4:

Fig. 4 instances the assembly of two plies only with the outer reinforcements lying on the ply without being entirely embedded thereon.

Figure 1:
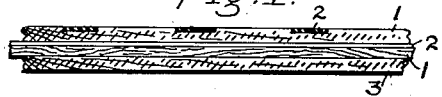
Figure 5:
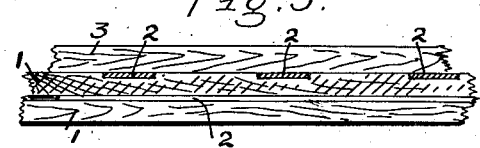

Fig. 5 is similar to Fig. 1 with the supporting sheet placed in front of the reinforcement to cover the same.

Figure 6:
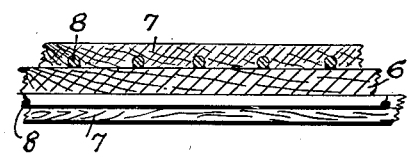

Fig. 6 instances the use of rods instead of flat steel or other metallic bands. It instances the use of a central supporting ply.

Figures 7, 8:
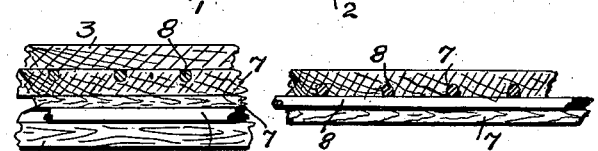

Fig. 7 is a cross section showing the central reinforced plies covered by supporting plies on both sides.

Fig. 8 shows two plies with the reinforcements adjacent each other.

Figure 9:
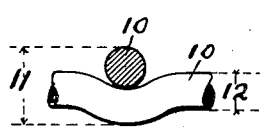

Fig. 9 is a cross section of the double thickness found in ordinary woven wire netting.

Figure 10:
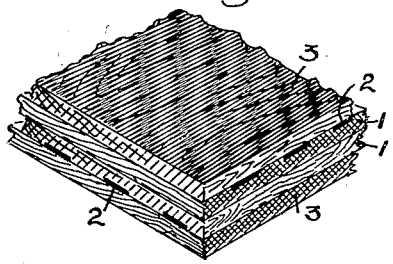

Fig. 10 is a sectional perspective view instancing an arrangement similar to Fig. 7 with the substitution of bands for the round metal strips.

Figure 11:
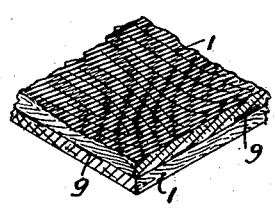

Fig. 11 is a perspective view showing very thin bands placed adjacent each other in adjoining plies without incurring the double-thickness defect disclosed by Fig. 9.

Heretofore it has been the practice to construct laminated veneers by placing thin laminæ of wood in contact with each other so that the grain of adjacent plies are at an angle to each other and cementing the layers by means of any suitable cement. When such veneers required reinforcing it has been the practice to place wire netting between the plies at the time of cementing and subjecting them to heavy pressure during the time the cement hardens. Such reinforcements present insuperable difficulties because one set of elements are found parallel with the grain of one ply and the other interwoven elements are found to cross the grain, in addition the double-thickness of the elements where they cross each other prevents full and lasting adhesion of the plies at such point. Furthermore it is almost impractical to properly embed any reinforcing element that is placed at an angle to the grain of the veneer sheets.

With my improved form of reinforcement of which instances of adaptation are shown in the drawing I utilize separate metallic elements of various form in cross section adapted to the special demands of the service in which the product is to be used, and place them substantially parallel to each other and the ply grain, thus causing the reinforcements and grain of one surface to lie at an angle to those of the adjacent surface of another ply. When thus disposed the application of pressure causes the reinforcing elements to embed themselves in the ply with the grain of which they are parallel and not in the opposite piece. The cement of course holding the parts united.

It will be readily seen that with my improved assemblage of the veneer and the reinforcements there can be no uncemented interspaces because all the surfaces, after the reinforcements are in position, are flat without any protrusions whatever and they are most effectively brought together in ultimate contact over their entire surface.

Referring to the instanced figures of the drawing in detail, suitable plies 1 have embedded therein reinforcements 2. The reinforcements may be flat bands 2, round wires 8, very thin ribbons 9 or of any desired form in cross section, as shown in Figs. 1, 6, and 11. Strips 4 may be partially embedded on the outside face of ply 5 joined to a ply 1 having metallic bands 2 on its inner face, if required for any special structural reasons. Fig. 8 instances a two ply unit in which the plies 7 have reinforcements 9 facing each other similar to Fig. 8 wherein wires 8 are shown embedded in the contacting faces of plies 7.

Figure 2:
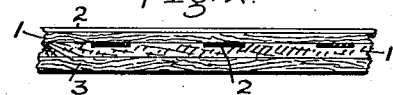
Fig. 2 is an elevation in cross section of Fig. 1.
Figure 3:
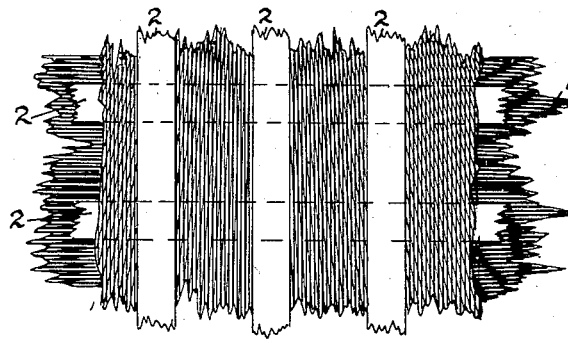
Fig. 3 is a plan view of Fig. 1.

Figs. 1, 2 and 3 illustrate a three ply unit in which an extra ply 3 is placed on the far side of plies 1 leaving one ply with the wholly embedded reinforcements 2 on the outside. Such an extra sheet 3 may be placed on the outside of reinforcements 2 as shown in Fig. 5 when the reinforcements are not on adjacent faces, so as to cover one set of reinforcing elements. An extra ply 6 may be placed between reinforced plies 7 as shown in Fig. 6. In a four ply unit extra sheets 3 may be placed on the outside of both central plies. As instanced in Figs. 7 and 10 or any other combinations may be used as found desirable.

The disadvantages of interwoven netting is shown in Fig. 9 wherein the wire elements 10 are of a thickness 12 which doubles up where they cross each other to dimension 11 making it impossible to properly cement plies to each other when such reinforcements are utilized.

My disposition of the reinforcements is considered of fundamental importance and any alternative arrangement of separate reinforcing elements formed of any adaptable material that does not have such elements cross each other between two adjacent faces of the laminæ is claimed in its broadest sense when specific plies have their principal components disposed parallel to the reinforcements with which each ply is combined.

What I claim is—

1. In laminated veneers, a plurality of plies of material having a longitudinal grain disposed at an angle to each other, separate reinforcements interposed between and embedded in one face of such plies and disposed parallel to the grain of the respective ply in which they are embedded.

2. In laminated veneers, separate layers of wood suitably cemented to each other, and independent reinforcing elements combined with one or more of such layers in parallel relation to the grain of the layer with which it is combined.

3. In laminated veneers, separate layers of veneer cemented to each other, and independent reinforcing elements combined with certain of such layers by being embedded in one face thereof while disposed parallel to the grain thereof.

4. As a new article of manufacture a composite veneer composed of laminæ of material having a longitudinal grain suitably held together so as to present the grain of adjacent laminæ at an angle to each other, and independent reinforcements combined with individual laminæ in directions parallel to the grain thereof so that the different sets of reinforcements are disposed at an angle to each other in the completed product.

5. The method of reinforcing veneers consisting in superposing separate layers of material having a longitudinal grain with individual reinforcements placed therebetween parallel to the grain of an adjacent layer, cementing the layers, and lastly subjecting the combined layers and reinforcements to pressure so as to embed the reinforcements in their respective layers and complete the adhesion of the elements to each other to form a composite structure.

6. The method of forming reinforced veneers, consisting in interposing between the layers thereof, separate reinforcements for different faces of separate layers placed parallel to each other and the grain of an adjoining layer and a cementing medium and subsequently subjecting the combined elements to pressure to complete the adhesion thereof and embed the reinforcements in their respective layers.

7. The method of forming reinforced laminated veneers, consisting in interposing reinforcing elements parallel to each other between the layers and parallel to the grain of one of the corresponding adjacent contact surfaces, in placing an adhesive between the surfaces to be joined, and lastly subjecting the composite elements to pressure to complete the cementation of the layers and the embedment of the reinforcements.

In testimony whereof I affix my signature in presence of two witnesses.

MELVILLE W. MIX.

Witnesses:
PAUL S. FUSON,
JENNIE M. MOSHER.